Dec. 27, 1955  P. S. DICKEY  2,728,833
RESISTANCE THERMOMETER
Filed March 26, 1953
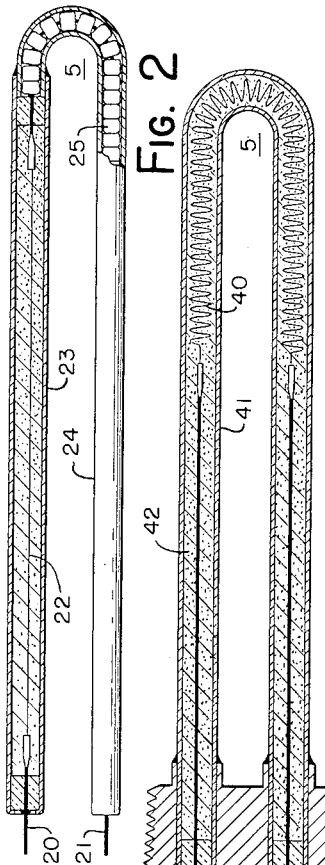
Fig. 2
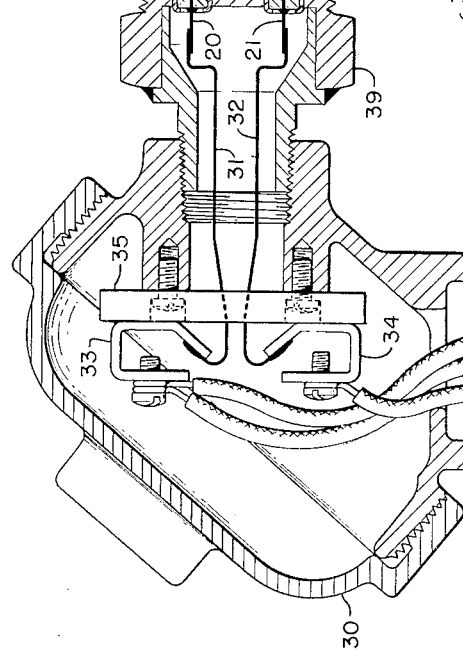
Fig. 3
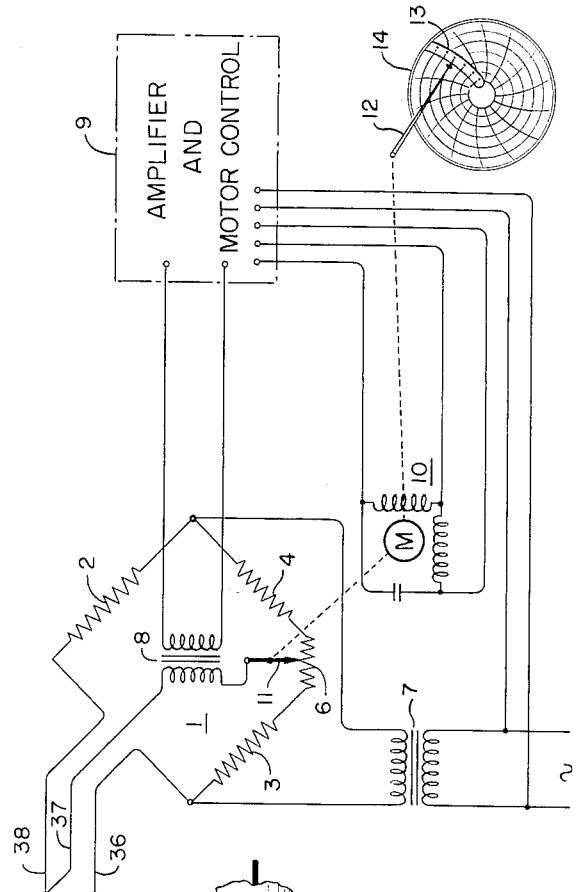
Fig. 1
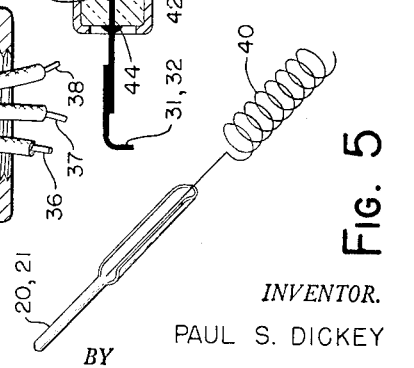
Fig. 4
Fig. 5
INVENTOR.
PAUL S. DICKEY
BY
Raymond D. Junkins
ATTORNEY

2,728,833

RESISTANCE THERMOMETER

Paul S. Dickey, East Cleveland, Ohio, assignor to Bailey Meter Company, a corporation of Delaware Application March 26, 1953, Serial No. 344,825

2 Claims. (Cl. 201—63)

This invention is broadly directed to an improved mounting for electrical temperature measuring elements. The broad problems of protecting all types of these elements, including both resistance thermometer elements and thermocouples, are met with a structure which is more rugged and efficient than anything heretofore commercially conceived or made available.

This invention has been embodied in an improved form of an electrical resistance type of thermometer as shown. More specifically, the present embodiment provides a resistance thermometer structure which associates its wire of variable resistance so slosely with the condition to be measured that it is commonly referred to as a "bare-bulb" thermometer.

A fundamental phenomena of metals, in general, is that the electrical resistance of such material varies with temperature. If a metallic wire is associated with a variable temperature condition to be measured, its change in resistance is indicative of the change in degree of temperature of the condition. If a metal is selected for the wire with a characteristic of resistance variation both linear and steep over an expected range of temperature, the wire may be incorporated into a balanceable electric network to indicate, with accuracy and sensitivity, values of temperature over the range. Subsequent unbalance of the network, due to changes in resistance of the wire, may be rebalanced by varying a compensating resistance in the network, and the mechanical rebalance motion may be caused to form an indication or a record of the values of the temperature condition. The present invention is directed to a structure for associating the resistance wire intimately, and efficiently, with the temperature condition while simultaneously protecting it, mechanically, from destructive factors associated with the condition.

Broadly stated, the present invention has as an object the mounting of an electric temperature measuring element in such manner that it will be maintained electrically insulated, free of the destructive effects of foreign material which will short the element and free of mechanical stresses which bias, or alter, the electrical resistance, if a wire is used, independent of temperature change.

The resistance wires of electric thermometers have been surrounded by several types of material in order to associate the wire very closely with the temperature condition but mechanically shield it from detrimental conditions. In the use of these materials, quartz being a dominate material of this class, the fact has been largely ignored that if the quartz is formed directly around the wire it may protect the wire from exposure to detrimental conditions at the point of measurement, but it also grips the wire so tightly as to set up internal stresses which vary the electrical resistance independently of temperature. The present invention is directed to housing a temperature responsive electrical wire of a resistance thermometer in order that it may be very closely associated with the temperature condition, but at the same time, suspending the wire firmly without setting up internal stresses within it.

In general, the housing for the resistance wire should be so completely integrated with it in combination that the resulting structure is regarded as a unitary temperature "bulb" which is adapted for direct exposure to the temperature condition. The resulting structure becomes a unified article of manufacture adapted to ready incorporation into several types of balanceable electric networks which indicate and/or record the resistance change of the wire as the temperature value, and change in value, at the condition. With the present invention, uniformity promotes reproducibility of resistance with respect to temperature as well as reduction of hysteresis. Field calibration becomes possible and the consistent measurement of temperatures ranging up to 1500° F. becomes practical with this type of thermometer.

In the measurement of temperatures above 1000 degrees, the thermocouple, as a primary element, has been heretofore selected for commercial processes and power producing operations on at least the basis of size. The comparatively small size of a thermocouple gives it an advantage in location in comparatively small spaces. The present invention now tends to reduce this advantage by providing a resistance thermometer element which is generally smaller than conventional forms and which compares favorably in size with the thermocouple.

Another basis of comparison, long detrimental to the resistance thermometer, has been that of adaptability to high temperatures over long periods of time. The thermocouple is not as sensitive as the resistance thermometer to either deterioration due to high temperatures or foreign matter. However, the present invention offers unique and efficient protection to the resistance wire which enables its maximum practical range to far exceed that of present commercial forms of resistance thermometers and to approach that of the thermocouple.

The response lag of electric resistance thermometers has compared unfavorably with that of thermocouples because the measures taken in the past to protect the resistance wire have inherently limited the transmission time of a temperature change from the condition to the wire. The present invention gives a degree of protection to the resistance wire far in excess of conventional mountings on the basis of the amount of material placed between the temperature condition and the resistance wire, yet the structure reduces the time lag of transmission far below what would normally be expected of resistance thermometers.

Considering the resistance wire of these thermometers, in its inherent form and arrangement, it is recognized that, as an included element of a balanceable electric network from its ends, it must form a U-bend, including its leads incorporating it into its balanceable electric network. Generally, then, the wire, as a longitudinal form, must be extended into and returned from the condition or a lead must extend into the condition to complete the electrical connection with the end of the wire extended into the condition. In prior mountings, taking this fundamental arrangement into account, a protective casing, utilized for these resistance wires, has been conceived as passing the resistance wire down to one end, into the condition, and returning from that end along the same longitudinal dimension of the casing. Such construction, whereby a lead wire or connection return from the far end of the resistance element wire was brought back through the same outer casing, meant that the return lead must be electrically insulated from the casing and also from the active resistance wire. Thus the casing must usually be several times the size that would have accommodated the resistance wire above; with resulting increase in time lag due to extra casing wall thickness, air or gas films or pockets, electrical insulation, and the like. The same was true if the resistance wire itself was brought back from the far end for the same insulation problems were present. With the arrangement of the present invention, the protective casing, or tube, is so integrated with the resistance wire and its leads that the entire structure, in one form, is given a U-bend to take the wire into and out of the condition.

It is conceivable, with the present invention, that the protective casing, or tube, can be made so relatively small with respect to the resistance wire, that the entire structure is materially smaller than prior and present forms. This size reduction is obtained without sacrificing strength, or ability to protect the resistance wire. The preferred embodiment establishes a U-bend at the midpoint of the protective casing, thus arranging the leads in adjacency. It is, however, possible to extend the protective casing, or tube, straight into the condition and protect the lead, which must be brought back, by a separate protective casing. In either event, the invention includes a protective tube for a resistance wire element of a thermometer running straight through its longitudinal dimension in order to reduce the cross-sectional area of the tube and therefore promote the intimacy of the association of the wire with the temperature condition. This resulting combination is fundamentally more simple than conventional arrangements for purposes of manufacture, aside from the other advantages of improved response, decreased size and resulting ruggedness.

The electric resistance thermometer has fundamentally greater accuracy than the thermocouple type of instrument. In the present invention the benefits of this greater accuracy are retained while other characteristics have been improved. The result is a resistance thermometer whose primary element has a high degree of mechanical durability, a smallness of size, a large range of temperature measurement, a high speed of response, and a structure which is fundamentally easy to manufacture.

While the specific embodiment of the invention disclosed is directed to a resistance thermometer, it is to be understood that the combination could well include a thermocouple to advantage. This is contemplated despite the comparison made between the combination with a resistance element wire and the theoretically bare thermocouple. Many of the benefits of the invention will accrue to a combination including a thermocouple although the concern of the specific embodiment disclosed is the resistance type of thermometer.

In the drawings:

Fig. 1 is an elementary diagram of a balanceable electrical network adapted to include the present invention as a temperature sensitive resistance element.

Fig. 2 is a partially sectioned elevation of one form of the invention.

Fig. 3 is a sectioned elevation of the preferred form of the invention as arranged for incorporation in the network of Fig. 1.

Fig. 4 is a partially sectioned elevation of a detail of the structure of Figs. 2 and 3.

Fig. 5 is a perspective view of a detail of the invention as partially assembled.

Going first to Fig. 1, it may be clearly seen that there is disclosed a very elementary balanceable electric network, specifically a Wheatstone bridge 1 having fixed resistance arms 2, 3 and 4; a variable resistance at 5 for exposure to a temperature condition to be measured; and an adjustable balancing potentiometer resistance 6. This bridge 1 is conventionally energized from an A.-C. source, indicated generally as a supply transformer 7. An output transformer 8 is provided, to be connected across the bridge by conjugate conductors opposite the connections from the bridge supply transformer 7. This transformer 8 amplifies the unbalance of the bridge 1 to some extent and transmits it to an amplifier and motor control circuit 9 which directly controls the speed and direction of rotation of a motor 10. Diagrammatically, as disclosed, the motor 10 is shown as a capacitor-run motor with mechanical connections indicated as going to a contactor 11 on the resistance 6 and simultaneously positioning an indicating-recording pen 12 relative to a scale 13 and a chart 14.

With the temperature sensitive resistance of bridge 1 established at 5, a change in the temperature to be measured at this location results in the resistance of the element at 5 increasing or decreasing to unbalance the including bridge 1. This resulting unbalance of bridge 1 is taken into the amplifier and motor control network at 9 for direct control of the positioning motor 10, in one direction or the other. Motor 10 mechanically positions contact 11 along resistance 6 until the bridge is balanced and this motion is also transmitted to the pen 12 to indicate and record the change, and the value, of the new temperature.

The present invention is concerned with the structure at 5. Fig. 2 illustrates one embodiment of this invention. Arbitrarily, the complete structure, including the resistance wire, is diagrammatically designated at 5. The diagrammatic representation of leads from the resistance wire at 5, in Fig. 1, poises something of a problem in that, as a practical matter, these diagrammatic leads have several sections as will be subsequently disclosed. Basically, however, the structure of the invention centers, in Fig. 2, about the resistance wire 22.

Returning to the scope of the introductory remarks, it is necessary to keep in mind that the resistance wire is to be associated as intimately with the temperature condition as possible. It is also essential that the comparatively delicate resistance wire be mechanically protected from factors of the temperature condition other than heat itself. Fig. 2 discloses one form of a protective housing which has been provided for resistance wire 22, and which adequately protects it physically while allowing it to go through a change in electrical resistance, consonant with temperature change, without establishing any mechanical stresses which bias, or alter, the electrical resistance.

A metallic sheath 23, or tube, having a circular cross-section, has the resistance wire 22 centrally, and longitudinally, suspended within it, between leads 20 and 21. In this embodiment of Fig. 2, it is the object of the arrangement to extend the resistance wire 22 straight into the temperature condition, its complete length. As this arrangement necessitates the wire 22 having its extended end in the temperature condition, the lead associated with that end must also extend into the temperature condition for completing the electrical circuit including the resistance wire 22. A protective sheath 24, or tube, is provided for the lead extended into the condition. Lead 21 has been arbitrarily chosen for this arrangement and its protective sheath 24 has been given a 180 degree, or U-bend, in order to return the lead from the condition back to a point adjacent lead 20 from which a conventional wiring arrangement will complete incorporation into bridge 1.

It will be noted, in the disclosure, that sheath 24 is telescoped into the extended end of sheath 23 and welded thereto. Lead 21 is electrically insulated from the metallic walls of sheath 24 by ceramic insulators 25. These insulators 25 are preferably short, cylindrical, centrally-bored bodies strung, bead-like, along the length of lead 21, enabling sheath 24 to be given its U-bend without deformation of any specific body 25.

It is desired to next consider Fig. 3 to describe the disclosure of the preferred embodiment of the invention in connection with the remaining details which are generic to the invention. As Fig. 3 discloses the preferred embodiment, the conventional cast and machined socket head, for housing the lead terminals, has been associated with this structure. Initially, it can be seen that leads 20 and 21 are attached to extension leads 31 and 32 for taking the electrical connections back to terminals 33 and 34 which are attached to an insulating plate 35, mounted within socket head 30. Wires 36, 37 and 38 complete the connections back to bridge 1 for incorporation of the resistance wire into said bridge as a temperature sensitive element. Of course, in Fig. 1, these several sections of the leads are disclosed diagrammatically and unitarily. For convenience of reference they are designated in Fig. 1 as 36, 37 and 38 to correspond with the final wires coming from socket head 30.

Conventionally, the temperature condition to be measured is within some form of container and access to it must be had through the wall of the container. The temperature sensitive element at 5 is extended through a hole in the container wall and held in position, essentially, by a solid welding head, such as disclosed at 39. This welding head 39 may be screwed into the container wall hole and additionally welded if necessary. For the purposes of accommodating this preferred embodiment of the invention, this welding head 39 has two holes through which the ends of the protecting tube are pressed in a tight fit. The entire assembly may be joined by welds around the accommodating holes in 39 for secure mounting of the resistance element at 5. Additional fittings, as needed, will then be mounted on head 39 to mount standard pipes and auxiliary support of socket head 30.

A structural provision in leads 31 and 32 should be noted in connection with the mounting head 39 and the fittings needed to mount socket head 30. The high temperatures with which the invention may be associated may, when suddenly applied, set up marked differences in expansion rates of the various components of the embodiment. The extension pipe from head 39 to head 30 may extend a much greater, relative, distance than the leads from terminals 33 and 34 to element wire 40. The resulting tension on these leads could separate them at their weakest point if some provision for mechanical expansion were not provided. Each of the leads 31 and 32 are given at least a couple of bends, as shown within head 39. These bends will straighten out to allow longitudinal extension under this condition. If this is not sufficient, additional terms, or coils, may be formed in leads 31 and 32 for any required extension.

This specific arrangement of the preferred embodiment of the invention at 5 may now be examined further. The resistance wire is now designated as 40, in this preferred embodiment, although attached to conventional leads 20 and 21, after the fashion of the arrangement between resistance wire 22 and these same leads 20 and 21. A form is given the resistance wire 40, as it is arranged within sheath 41, different from that found in the arrangement of Fig. 2.

The first characteristic of resistance wire 40, to be noted in the preferred embodiment of Fig. 3, is that it is arranged in a coil form as opposed to the straight suspension of Fig. 2. Primarily, the object of this coil form is to bring as much of the length of the resistance wire 40 as close to the inner wall of the tube 41 as possible. This close tolerance will increase the speed with which fluctuations in the temperature condition will be transmitted to the resistance wire 40.

It may be well to recognize some of the relative sizes of the components of this embodiment as it has been reduced to actual practice. The resistance wire, whether it is 22 or 40, is so small as to be generally regarded as a filament. The diameter of this filament is in the order of .004 inch, and in the arrangement of Fig. 3 it is given 200 turns on a .065 inch mandrel and stretched to 4 or 8 inches between leads 20 and 21, depending upon the length that may be employed for tube 41. Should it be desirable to operate this resistance wire in a temperature range up to 1500° F., it has been found preferable to use molybdenum, the wire then having a fairly linear and sharp rise in resistance change over this range of operation. The resistance variation of nickel wire, of the same physical dimensions has been found satisfactorily linear and consistent over the lower ranges of temperature.

The leads 20 and 21, as well as extension leads 31 and 32, may be in the order of .032 inch in diameter and formed of Driver Harris "L" nickel, leads 20 and 21 are dead soft annealed in hydrogen on their ends joined to the resistance wire 40. It can be seen therefore, that the embodiment of Fig. 3 is shown substantially to actual scale. Originally leads 20 and 21 are made six inches long with the anticipation that the final, assembled, structure will have these leads fabricated down to 4½ inches in length. The important details of the electrical junction between the leads 20 and the resistance wires will be described subsequently.

The protecting tube, or sheath, 41 is preferably made of stainless steel by reason of this material being generally resistant to corrosion. One choice of original length, before assembly, is 14 inches long with a 3/16 inch outside diameter and .145 inch inside diameter. The stainless steel is annealed dead soft bright in an atmosphere of hydrogen to remove scale which would greatly hamper the comparatively delicate operation of manufacture and place undesirable foreign matter in the thermometer. With the resistance wire filament, leads and granular refractory material 42 in place, the cross-sectional area of this tube 41 is reduced approximately 11% by swaging. This means the outside diameter is reduced to approximately .170 inch.

The body of granular refractory 42 has offered some distinctive problems in this combination. There are two generally acceptable materials suitable for this purpose, having good electrical insulating properties and a high coefficient of heat transfer. Magnesium oxide and aluminum oxide may both be ground to sufficiently small granular size to lend themselves to being packed in the space remaining in tube 41 when it has the filament resistance wire and leads suspended centrally, and longitudinally, within it. Aluminum oxide has been found to be comparatively soft and the mesh size to which it is ground is, by such reason, relatively unimportant. Magnesium oxide, on the other hand, should be ground to at least 200 mesh although it need not be ground as fine as 325 mesh. With this granular refractory 42 packed into the remaining space within the interior of 41, the swaging operation will compact it still further, resulting in a substantially homogeneous combination of these four elements. The grain size for these refractories is selected so that this operation of swaging, wherein the cross sectional area of tube 41 is reduced by approximately 11%, will not result in the individual grains deforming or stressing the resistance filament. These proportions of size, selection of materials and degree of working were arrived at in a series of steps which resulted in a surprisingly successful solution of the problems faced.

Although the techniques of assembly of these components of the combination have been substantially indicated, some of the details involved should be disclosed for a better appreciation of the invention. After tube 41, has been vertically suspended, and resistance wires and leads 20 and 21 suspended therein, a vulcanized fibre plug is threaded on the lower lead and pressed up into the end of the tube 41. This fibre plug has been chosen, in material, for its ability to be easily machined and its stability in dimension over a reasonable range of ambient humidity variation. With the fibre plug in place on its lower end, tube 41 then has incremental amounts of the granular refractory dropped into its upper end. A reciprocating piston tube, over the assembly of resistance wire and leads, continually packs these incremental additions to the granular refractory snugly about the leads and resistance wire. When tube 41 is completely filled, another vulcanized fibre plug is threaded over the upper lead and pressed into the top of tube 41. The tube is spun-over these fibre plugs and the tube swaged uniformly throughout its length for the approximate 11% reduction in cross-sectional area.

After the stainless steel tube is swaged down into the form of tube 23, of Fig. 2, it is cut back a distance from each end in order to remove that portion containing the fibre plugs and expose a uniform length of leads 20 and 21. A section of the closely packed granular refractory is removed from each end of the tube, from about leads 20 and 21, and a ceramic insulator threaded on the lead and pressed into the end of the tube. Fig. 4 illustrates the final assembly including ceramic insulator 43 as it is threaded over the lead to form a mechanical seal against the body of granular refractory 42. The ends of tube 41 are again spun-over, as shown most clearly in Fig. 4, to form a retaining shelf of the tube wall which bears on the ceramic insulator body. There still remains the possibility that, with continuous vibration, the granular refractory will work its way between the lead and the sides of the hole through ceramic plug 43. This eventuality has been circumvented by placing a drop of solder at 44 which bonds to lead and plug to complete the mechanical capture of the body of granular refractory 42 within tube 41.

In order that the entire assembly, thus far described, may be subjected to a degree of heat approximating the maximum of the condition expected, these ceramic plugs 43 are made of material suitable for the application. An example of satisfactory material is called Fosterite, or Alsimag 243, by the American Lava Corporation. The foregoing materials, and their manner of combination, distinguish over any similar structure by the inventive concept inherent in the combination which adapts it to the particular problems solved.

Fig. 5 illustrates a final detail of the combination to be described, relating to the electrical junction between the leads and the resistance wire filament. In anticipation of this assembly, the ends of these leads have been dead soft annealed in hydrogen, as indicated previously. Thus annealed, these leads may be flattened about ⅜ of their length to a thickness of about .090 inch. The flat leaf formed may then be rolled to a tube in which the end of the resistance wires 40 and 22 may be inserted. The tube so formed about the wires may then be flattened and spot welded to complete an excellent electrical union which will withstand all expected mechanical forces.

An alternate form for the structure of Fig. 5, not illustrated, is possible if stainless steel capillary is available. If leads 20 and 21 were actually small tubes, the ends of resistance wires 22 and 40 could be slipped into the ends of the tube-leads, the tube ends could be flattened down on the wire ends and splot-welded thereto. This might be a production advantage over the disclosure of Fig. 5, if the stainless steel is available in a sufficiently small size.

The combination which has been described has proven to be a surprisingly efficient thermometer of the resistance type which has a speed of response favorably comparable to that of a bare thermocouple and a ruggedness not heretofore conceived. The stainless steel tubes 41, and 23 exposed directly to the temperature condition, transmit variations in the temperature condition immediately, and accurately to a packed granular refractory whose high thermal conductivity forms an efficient path of heat transmission directly to the resistance wire filament. With this particular arrangement of the basic components of tube, leads, granular refractory and resistance wire filament, the resulting combination at 5 is small, for convenience in physical location, with a heretofore unrealized efficiency of temperature detection.

The old complication of providing a return lead for these resistance wires filaments through the same sheath, tube or housing, through which the resistance element is extended into the condition, is eliminated by having a provision of this unique tube with the resistance wire filament and its leads extending in a continuous and uniform loop into, and out of, the condition. Small, corrosion resistant, efficient in operation, capable of withstanding a high degree of shock and vibration and capable of operating under pressures up to 20,000 p. s. i., this resistance thermometer attains all the objects heretofore desired.

What I claim as new, and desire to secure by Letters Patent of the United States, is:

1. A temperature responsive primary element including, in combination, a metallic tube swaged to substantially an 11% reduction of cross-sectional area, a metallic filament of coiled form arranged centrally and longitudinally within the tube in bringing it as close to the internal wall of the tube as consistent with mechanical support within an electrical insulation from the tube, a refractory of granular form filling the space between filament and tube and compacted by the swaging to the degree which provides mechanical support and prevents positional change and avoids electrical resistance change from mechanical distortion, and lead wires extending into each end of the tube to make electrical connection with each end of the filament.

2. The primary element of claim 1 including, ceramic bodies at each end of the tube with the leads extending centrally therethrough and the body of refractory retained thereby within the tube, and wherein the tube ends are spun-over to form a retaining shelf for the ceramic bodies within the tube.

References Cited in the file of this patent

UNITED STATES PATENTS

| | | |
|---|---|---|
| 1,359,400 | Lightfoot | Nov. 16, 1920 |
| 2,043,196 | Finlayson | June 2, 1936 |
| 2,216,375 | Minter | Oct. 1, 1940 |
| 2,316,872 | Kernen | Apr. 20, 1943 |
| 2,580,269 | Alvarez | Dec. 25, 1951 |

FOREIGN PATENTS

| | | |
|---|---|---|
| 226,478 | Germany | Apr. 15, 1943 |